US011105687B2

United States Patent
Sola Larrañaga et al.

(10) Patent No.: US 11,105,687 B2
(45) Date of Patent: Aug. 31, 2021

(54) APPARATUS AND METHOD FOR IN-LINE MEASUREMENT OF LASER PULSES WITH TIME-DEPENDENT POLARIZATION

(71) Applicants: UNIVERSIDAD DE SALAMANCA, Salamanca (ES); SPHERE ULTRAFAST PHOTONICS, S. L., Coruña (ES)

(72) Inventors: Iñigo Sola Larrañaga, Salamanca (ES); Benjamín Alonso Fernández, Salamanca (ES); Rosa María Romero Muñiz, Oporto (PT)

(73) Assignees: UNIVERSIDAD DE SALAMANCA, Salamanca (ES); SPHERE ULTRAFAST PHOTONICS, S.L., Boiro Coruna (ES)

( * ) Notice: Subject to any disclaimer, the term of this patent is extended or adjusted under 35 U.S.C. 154(b) by 0 days.

(21) Appl. No.: 16/484,605

(22) PCT Filed: Feb. 20, 2018

(86) PCT No.: PCT/ES2018/070116
§ 371 (c)(1),
(2) Date: Aug. 8, 2019

(87) PCT Pub. No.: WO2018/150071
PCT Pub. Date: Aug. 23, 2018

(65) Prior Publication Data
US 2020/0025628 A1    Jan. 23, 2020

(30) Foreign Application Priority Data
Feb. 20, 2017  (ES) ................. ES201730215

(51) Int. Cl.
*G01J 11/00*    (2006.01)
*H01S 3/00*    (2006.01)

(52) U.S. Cl.
CPC ............ *G01J 11/00* (2013.01); *H01S 3/0057* (2013.01); *H01S 3/0014* (2013.01)

(58) Field of Classification Search
CPC ..................................................... G01J 11/00
See application file for complete search history.

(56) References Cited

U.S. PATENT DOCUMENTS

| 5,936,732 A * | 8/1999 | Smirl ................. G01J 11/00 356/453 |
| 2008/0212103 A1 * | 9/2008 | Walmsley ........... G04F 13/02 356/450 |

(Continued)

FOREIGN PATENT DOCUMENTS

WO         03010487         2/2003

OTHER PUBLICATIONS

Ferrerio, Juan Jose et al. "Characterization of arbitrarily polarized ultrashort laser pulses by cross-phase modulation". Optics Letters, vol. 26, No. 13, Jul. 1, 2001, pp. 1025-1027. (Year: 2001).*

(Continued)

*Primary Examiner* — Michael A Lyons
(74) *Attorney, Agent, or Firm* — Hayes Soloway PC

(57) ABSTRACT

An apparatus and a method for in-line measurement of laser pulses with time-dependent polarization are described, which make possible to carry out in-line measurement of laser pulses whose polarization depends on time. For this, one or more polarization projections are selected: the spectrometer detects the projection on the extraordinary propagation axis of a birefringent system to measure the spectrum in that component, also the projection on the ordinary propagation axis, to measure the spectrum in that component, and finally a projection in an intermediate direction that allows to measure the interference spectrum between the two components. The method allows extracting the temporal evolution of the pulse and its polarization state as (Continued)

a function of time, spectral amplitudes and phases of the various polarization projections of the beam.

5 Claims, 1 Drawing Sheet

(56) References Cited

U.S. PATENT DOCUMENTS

| | | | |
|---|---|---|---|
| 2015/0109620 A1* | 4/2015 | Fuji | G01J 9/02 356/451 |
| 2018/0034227 A1* | 2/2018 | Trull-Silvestre | H01S 3/0057 |
| 2019/0170588 A1* | 6/2019 | Maia Da Silva | H01S 3/0014 |

OTHER PUBLICATIONS

Alonso, Benjamin et al. "Spatiotemporal amplitude-and-phase reconstruction by Fourier-transform of interference spectra of high-complex-beams". J. Opt. Soc. Am. B, vol. 27, No. 5, May 2010, pp. 933-940. (Year: 2010).*

Walecki et al., "Charcterization of the Polarization State of Weak Ultrashort Coherent Signals by Dual-Channel Spectral Interferometry", Optical Society of America, Optics Letters, vol. 22, Issue No. 2, Jan. 15, 1997, pp. 31-83, 3 pages.

Schlup et al., "Tomographic Retrieval of the Polarization State of an Ultrafast Laser Pulse", Optical Society of America, Optics Letters, vol. 33, Issue No. 3, Feb. 1, 2008, pp. 267-269, 3 pages.

Chen et al., "All-Optical Self-Referencing Measurement of Vectorial Optical Arbitrary Waveform", Optical Society of America, Optics Express vol. 22, Issue No. 23, Nov. 17, 2014, pp. 28838-28844, 7 pages.

Lopez-Lago et al., "Measurement of the Polarization Dynamics of Ultrashort Pulses by Using Nonlinear Phase Modulation and Channelled Spectroscopic Polarimetry", Journal of Optics A:Pure and Applied Optics, Institute of Physics Publishing, vol. 7, Jul. 15, 2005, pp. 400-403, 5 pages.

Rakhman et al., "Angle-Multiplexed Spatial-Spectral Interferometry for Simultaneous Measurement of Spectral Phase and Polarization State", Optical Society of America, Optics Express vol. 21, Issue No. 22,Nov. 4, 2013, pp. 26896-26907, 12 pages.

Boge et al., "Revealing the Time-Dependent Polarization of Ultrashort Pulses with Sub-Cycle Resolution", Optical Society of America, Optics Express vol. 22, Issue No. 22, Nov. 3, 2014, pp. 29667-26975, 9 pages.

Lepetit et al., "Linear Techniques of Phase Measurement by Femtosecond Spectral Interferometry for Applications in Spectroscopy", Optical Society of America, Optical Physics vol. 12, Issue No. 12, Dec. 1995, pp. 2467-2474, 8 pages.

Walmsey et al., "Charaterization of Ultrashort Electromagnetic Pulses", OSA Publishing, Advances in Optics and Photonics, vol. 1, Issue No. 2, Apr. 15, 2009, pp. 308-437.

* cited by examiner

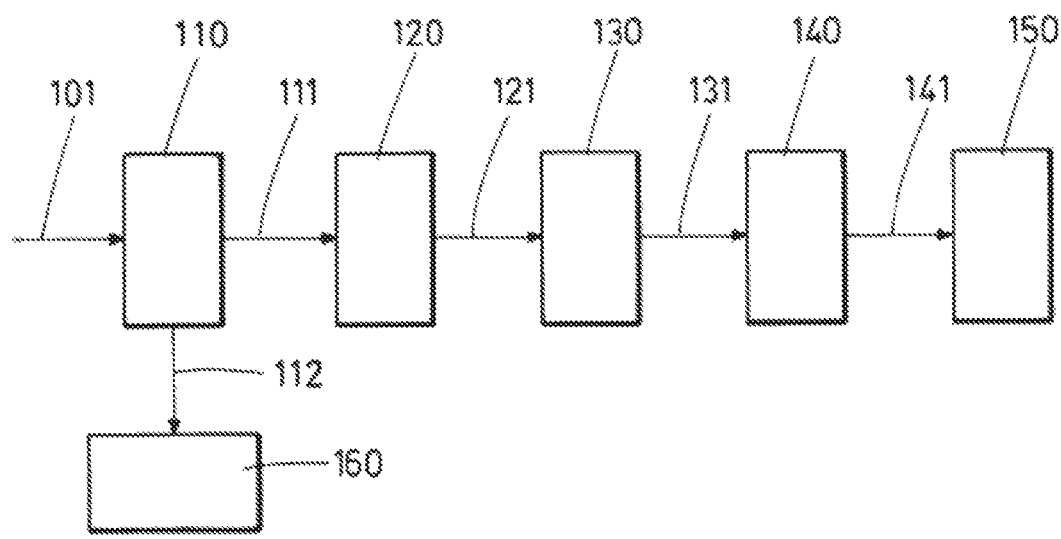

APPARATUS AND METHOD FOR IN-LINE MEASUREMENT OF LASER PULSES WITH TIME-DEPENDENT POLARIZATION

CROSS-REFERENCE TO RELATED APPLICATIONS AND PRIORITY

This patent application claims the benefit of PCT/ES2018/070116 filed Feb. 20, 2018, which claims priority from ES Patent Application No. P 201730215 filed Feb. 20, 2017. Each of these patent applications are herein incorporated by reference in their entirety.

OBJECT OF THE INVENTION

The object of the invention is in the field of Physics.

More specifically, this document is aimed at the in-line measurement of laser pulses with time-dependent polarization and a method of in-line measurement of laser pulses exhibiting time-dependent polarization, allowing to perform an in-line measurement of laser pulses whose polarization depends on time, i.e., it is variable on the time domain throughout the duration of the mentioned pulse.

BACKGROUND OF THE INVENTION

In the last decades it has been possible to generate pulses of laser light of extremely short duration (over the range of the femtosecond, $10^{-15}$ s). As a consequence, this has led to the development of new techniques for measuring such pulses (autocorrelation, SPIDER, FROG or d-scan, among others). These techniques have in common that they assume that light is linearly polarized and time-independent. Although it is the usual case to date, there are situations, in increasing number and interest, in which light has a certain polarization that changes over time.

The first characterization technique in the ultrafast range (i.e., femtosecond range) for pulses showing time-dependent polarization, known as "POLLIWOG", appears in 1997 in W J Walecki, D N Fittinghoff, A L Smirl, and R. Trebino, "*Characterization of the polarization state of weak ultrashort coherent signals by dual-channel spectral interferometry*", Optics Letters 22, 81-83 (1997). In this work, using spectral interferometry, the phase difference between vertical and horizontal polarization components of the study pulse is obtained, by referring them to an auxiliary reference pulse (both in spectral phase and in polarization). This phase difference between components, together with the spectral amplitudes (measured with a spectrometer, for example), allows the reconstruction of the polarization as a function of time. The technique is based on a double channel configuration, measuring in a same shot at each channel the phase difference of each polarization component of the pulse under study with the corresponding components of the auxiliary reference pulse.

Subsequently another approach to the problem was presented using tomographic reconstruction in P. Schlup, O. Masihzadeh, L. Xu, R. Trebino, and R A Bartels, "*Tomographic retrieval of the polarization state of an ultrafast laser pulse*", Optics Letters 33, 267-269 (2008). It is based on measuring the temporal reconstruction of the pulses at different linear polarization projections using some of the standard reconstruction techniques, suitable only for time-independent linear polarization, that is, they are not able to see the evolution of polarization. For example, two perpendicular projections are measured and one at 45° with respect to those. Knowing the perpendicular projection reconstruction, the phase between these components is adjusted to obtain the result of the intermediate projection at 45°. In this adjustment process the phase is determined, using previous data, therefore allowing obtaining the temporal evolution of the polarization.

Other optical techniques proposed in the literature are based on the Talbot effect as the detailed technique in C C Chen, and S D Yang, "*All-optical self-referencing measurement of vector optical arbitrary waveform,*" Optics Express 22, 28838-28844 (2014), in polarimetry based on nonlinear modulation of the phase as detailed in E. Lopez-Lago, and R. de la Fuente, "*Measurement of the polarization dynamics of ultrashort pulses by using nonlinear phase modulation and channeled spectroscopic polarimetry,*" Journal of Optics A—Pure and Applied Optics 7, 400-403 (2005), or in spatial-temporal interferometry multiplexed at an angle as the detailed technique in A. Rakhman, M W Lin, and I. Jovanovic, "*Angle-multiplexed spatial-spectral interferometry for simultaneous measurement of spectral phase and polarization state,*" Optics Express 21, 26896-26907 (2013). Recently a technique based on experiments of attosecond streaking uses a reaction microscope. This technique, detailed in R. Boge, S. Heuser, M. Sabbar, M. Lucchini, L. Gallmann, C. Cirelli, and U. Keller, "*Revealing the time-dependent polarization of ultrashort pulses with sub-cycle resolution,*" Optics Express 22, 26967-26975 (2014), in addition to being very complex and expensive, is far away from the concept presented here.

The technique and apparatus of the present invention are based on an in-line configuration, in contrast to the dual configuration described above by W J Walecki, D N Fittinghoff, A L Smirl, and R. Trebino, "*Characterization of the polarization state of weak ultrashort coherent signals by dual-channel spectral interferometry*", Optics Letters 22, 81-83 (1997). In the present invention, no auxiliary reference beam is used, while one of the polarization components of the pulse under study plays the role of the reference.

This allows an in-line configuration of the device, robust and simple, avoiding noise and instabilities (vibrations, air currents, etc.), associated with classical interferometers.

DESCRIPTION OF THE INVENTION

Herein it is described an apparatus for characterizing light exhibiting time-dependent polarization, while overcoming the drawbacks and disadvantages of the abovementioned methods and, at the same time, providing not only higher stability against vibrations, but also easier alignment, compared to the known devices so far.

This way, it is presented a first aspect of the invention, corresponding to an apparatus for the in-line measurement of laser pulses with time-dependent polarization, which allows to carry out, among others:

Studies on dichroism, chirality and optical activity of species.
Studies on nonlinear polarization phenomena.
Application optical spectroscopy at nanometer range.
Studies of molecular systems through pulses modulated on polarization
Studies on quantum dots.
Characterization of pulse trains in telecommunications.
Analysis of nonlinear effects on light with time-dependent polarization.

Also, there is a second aspect of the invention, corresponding to a method of in-line measurement of laser pulses with time-dependent polarization. This measurement method is carried out firstly with a known polarization beam, in order to calibrate the spectral phases introduced by the measurement device. Next, the procedure to measure the beam to be analyzed is reproduced. By means of an auxiliary system of reconstruction of non-vector pulses (that is, having only one component of linear polarization), the spectral phase of one of the two beam components (ordinary or extraordinary) is determined, which will act as the reference. Thanks to the delay between the ordinary and extraordinary components introduced by a birefringent element and by means of a spectral interferometry based reconstruction method, using the previously measured data, the spectral amplitudes and phases of the two polarization components, ordinary and extraordinary, of the beam under analysis are extracted. Subsequently, by applying Fourier transform to such spectral amplitudes and phases, the evolution of the ordinary and extraordinary components of the beam to be analyzed is temporarily reconstructed, obtaining the polarization state of the time-dependent light pulses.

In order to carry out the method of the second aspect of the invention, a process of measurement must be carried out in the following way:

1. A measurement of the pulse spectrum is made with the linear polarizer placed so as to allow only the ordinary polarization component of the birefringent system to pass (120). In this way the spectrum of the ordinary polarization component is known.
2. A measurement of the pulse spectrum is made with the linear polarizer placed so that only the extraordinary polarization component of the birefringent system passes through. In this way the spectrum of the extraordinary polarization component is known.
3. A measurement of the pulse spectrum is made with the linear polarizer placed at an angle between the directions of vibration of the ordinary and extraordinary polarization components of the birefringent system (e.g., 45°). The spectral interferences in this spectrum contain the information about the phase difference between both components.
4. One of the two polarization components of the pulse is selected and its spectral phase is characterized by measuring it with a standard technique for reconstructing pulses with constant linear polarization (e.g. FROG, SPIDER, d-scan). This way, the reconstruction of the polarization component acting as the reference pulse is obtained. This selection can be made in several ways, for example, a linear polarizer can be used, allowing only the component to be measured to pass through. Other example would be to measure it with the polarizer of the assembly by selecting the reference and measurement component by subtracting the dispersion that the birefringent element can provide or using a Brewster angle surface, so that the reflected light will be polarized in a direction perpendicular to the incidence plane.
5. With the previously acquired data, spectral interferometry reconstruction algorithms are used, such as those described in L. Lepetit, G. Cheriaux, and M. Joffre, "*Linear techniques of phase measurement by femtosecond spectral interferometry for applications in spectroscopy,*" *Journal of the Optical Society of America B—Optical Physics* 12, 2467-2474 (1995). In the said reconstruction, the reference pulse will be the previously reconstructed polarization component. This way, the spectral phase of the second component will be obtained without ambiguity with respect to the first. This allows knowing, by means of Fourier transform, the polarization state of the pulse as a function of time.

Before a measurement, a calibration of the apparatus can be performed. To this end, the measurement of a pulse with known polarization will be made (for example, a pulse with linear polarization at 45° between the ordinary and extraordinary directions of the birefringent system). After carrying out the measurement process, the relative phase extracted between both components will be the calibration phase of the device, which must be subtracted from the measurements that are made. This calibration phase will be valid while the measurements are made with the beam aligned in the device in the same way and provided that the pulse to be measured has no new spectral components with respect to the pulse used in the calibration.

As indicated above, to carry out a measurement of a problem pulse, the beam is aligned, ensuring that it is the same alignment as the calibration one. Subsequently, and in a manner similar to that described above, a measurement is made with the polarizer parallel to the direction of the ordinary component of the birefringent element, a second measurement with the polarizer parallel to the direction of the extraordinary component of the birefringent element and a third measurement with the polarizer in the intermediate direction (typically 45°, but it could be another).

It should also be noted that, when assembling the device, it may be necessary to calibrate the response of the spectrometer (or monochromator, optical spectrum analyzer, spectral characterization system, etc.) with polarization. For this, a linearly polarized beam can be used, to which the polarization is rotated (for example, by a half-wave waveplate) and the signal measured by the spectrometer for the various orientations is recorded. This calibration can be carried out only once, it would be valid later, provided that the pulse to be measured has no new spectral components with respect to the pulse used in the calibration.

DESCRIPTION OF THE DRAWINGS

To complement the description that is being made and in order to help a better understanding of the characteristics of the invention, according to a preferential, but not in a restrictive way, example of practical embodiment of the same, is accompanied as an integral part of the said description, a set of drawings wherein with character illustrative and non-restrictive, the following has been represented:

FIG. 1.—FIG. 1 presents a flowchart of the second aspect of the invention, while the various components of the apparatus of the first aspect of the invention method are shown.

PREFERRED EMBODIMENT OF THE INVENTION

In a preferred embodiment of a first aspect of the invention there is an apparatus for in-line measurement of laser pulses with time-dependent polarization, apparatus comprising one or more, preferably one, plates of birefringent material that define a birefringent system (120), preferably with the optical axis perpendicular to the direction of propagation of the beam, a linear polarizer (130) and a spectrometer (140) in the spectral range of the beam to be measured acting as a spectral characterization system; so that by passing light through the plate, their extraordinary and ordinary polarization components present a delay between them.

This way the apparatus of the first aspect of the invention is obtained, which comprises a plate of birefringent material, with the optical axis perpendicular to the direction of propagation of a beam to be measured, means of spectral characterization of light, as it can be a spectrometer, in the range of the beam to be measured, and a linear polarizer adapted to select several polarization projections. The operation or implementation of that apparatus can be observed in FIG. 1, where there is an incident beam (101) to be analyzed, which passes through a surface of an optical element (110) to select a polarization component, which is a reference component (112), and leads it to a pulse temporal measurement device (160) of linearly polarized pulses; as an example, but not limiting, the surface of an optical element (110) may be a surface which can be introduced into the optical path, on which the beam (101) bounces at Brewster angle, a mirror that reflects the beam (101) and makes it pass through a linear polarizer with calibrated dispersion, etc.

This selection will be made only when it is desired to measure the reference component (112). When this selection is not made and a measurement in polarization is made, an outgoing beam to be analyzed (111) arrives at a birefringent system (120) that decomposes the beam into two polarization components, ordinary and extraordinary, traveling at different speeds through the birefringent system (120). The resulting beam (121) after the pass through the birefringent system (120) passes through a linear polarizer (130) which will be oriented to select one or more polarization projections. The resulting light (131), which is linearly polarized with respect to certain directions of interest, will be coupled to a spectral analysis unit (140), such as a spectrometer (140), to carry out a spectral analysis in the range of the incident beam spectrum (101) to be analyzed. The resulting data (141) will be analyzed in a data processor (150).

This operation makes use of the said linear polarizer (130) by which it is possible to select one or more polarization projections that the spectrometer (140) will measure:

Projection in extraordinary wave direction: allows measuring the spectrum in that component.

Projection in ordinary wave direction: allows measuring the spectrum in that component.

Projection in an intermediate direction (typically 45°): it allows to measure the spectrum presenting interferences between the two delayed components that, through a Fourier filtering process, provides the phase difference between them, fundamental for the determination of the spectral phase of each component, ordinary and extraordinary.

In a preferred embodiment of a second aspect of the invention corresponding to an in-line measurement method of laser pulses with time-dependent polarization making use of the apparatus of the first aspect of the invention, the incident beam (101) to be analyzed must be passed through the birefringent system (120), to later select the polarization projection in the ordinary direction of the birefringent medium by rotating the linear polarizer (130).

Next, the polarization projection in the ordinary direction of the birefringent medium is detected and measured by the spectrometer (140), to later select the polarization projection in the extraordinary direction of the birefringent medium or birefringent system (120) by rotation of the linear polarizer (130). Once this is done, it is possible to proceed to detect and to measure that polarization projection using the spectrometer (140).

Once the polarization projection has been selected in one direction with ordinary and extraordinary components (for example, at a 45° angle with respect to them) of the birefringent medium by rotation of the linear polarizer (130), it is proceeded to detect and to measure, using the spectrometer, the polarization projection with the structure of interferences between the two components to be able to extract, by means of a spectral interferometry reconstruction algorithm, also using the spectra of the projections of the ordinary and extraordinary components measured in previous steps, the amplitude of the ordinary and extraordinary components of the beam to be analyzed and the difference between their spectral phases after having passed through the birefringent system.

Additionally, the device can be calibrated with a polarized beam in a known manner, for example, linearly with projections in the ordinary and extraordinary propagation components in the birefringent medium, to determine the dephasing of the two components, ordinary and extraordinary, in the said birefringent material.

Furthermore, the method of in-line measurement of time-dependent polarized laser pulses of the invention may comprise eliminating the contribution due to the birefringent system to the difference of spectral phases between the ordinary and extraordinary components after the birefringent material, obtained as such it is detailed above, extracting in this way the difference of spectral phases between the ordinary and extraordinary polarization components before going through the birefringent material.

Then, one of the polarization components is preferably selected, as an example, but not limiting, prior to the birefringent system (120), being these an ordinary component and an extraordinary component with respect to the birefringent system, to subsequently measure the phase of the reference component previously selected. The measurement of the spectral phase of the reference component of the step can be carried out by means of a pulse reconstruction technique with constant polarization, such as FROG, SPIDER or d-scan.

In addition, the spectral phase of the reference component said above is added to the difference of spectral phase between the ordinary and extraordinary components before passing through the birefringent material, obtained as indicated previously, by calculating this way the spectral phase of the other polarization component. From these spectral phases and the spectra of the projections of the ordinary and extraordinary polarization components of the beam (101) measured as previously detailed, the complex spectral amplitudes of the projections of the ordinary and extraordinary polarization components of the beam (101) are calculated. Once this is done, the evolution of the ordinary and extraordinary components of the beam to be analyzed can be temporally reconstructed (101) with the Fourier transformation of said complex spectral amplitudes, obtaining the polarization state for each moment of the pulse.

The invention claimed is:

1. An in-line measuring apparatus of laser pulses with time-dependent polarization, that allows extracting a temporal evolution of a laser pulse to be measured and its polarization state as a function of time, wherein the apparatus comprises:

a surface of an optical element configured to select a reference component from the laser pulse, the reference component being any linear polarization projection of the laser pulse, a pulse temporal measurement device configured to perform temporal characterization of the reference component, a birefringent section, following the surface of an optical element and receiving the laser pulse, configured to decompose the laser pulse into two polarization components, ordinary and extraordinary, traveling at different speeds through the birefringent section, a linear polarizer, following the birefringent section, configured to select a polarization projection of the laser pulse, a spectrometer, configured to measure a spectrum of the selected polarization projection of the laser pulse, and a data processor configured to obtain the time evolution of the laser pulse and its polarization state, using resulting data measured from the spectrometer and the pulse temporal measurement device.

2. A method of in-line measurement of laser pulses with time-dependent polarization that allows extracting a temporal evolution of a laser pulse and its polarization state as a function of time, wherein the method comprises:

i. passing an incident laser pulse through a birefringent medium,
  ii. selecting, from the laser pulse, a polarization projection in the ordinary direction of the birefringent medium,
  iii. detecting and measuring a spectrum of the polarization projection in the ordinary direction,
  iv. selecting the polarization projection in the extraordinary direction of the birefringent medium,
  v. detecting and measuring the spectrum of the polarization projection in the extraordinary direction,
  vi. selecting a polarization projection in one direction with ordinary and extraordinary components of the birefringent medium,
  vii. detecting and measuring the spectrum of the polarization projection in one direction with ordinary and extraordinary components,
  viii. selecting a reference polarization component from the laser pulse, the reference polarization component being the ordinary component or the extraordinary component defined with respect to the birefringent medium,
  ix. measuring a spectral phase of said reference polarization component selected from the previous step,
  x. extracting, with a reconstruction algorithm of spectral interferometry, using the data obtained in the previous steps, a spectral amplitude of the ordinary and extraordinary components of the laser pulse and a spectral phase difference between ordinary and extraordinary components after having passed through the birefringent medium,
  xi. subtracting to the spectral phase difference between ordinary and extraordinary components, from the previous step, the contribution to the spectral phase difference between the ordinary and extraordinary components due to the birefringent medium, obtained by calibration, thus obtaining the spectral phase difference between ordinary and extraordinary components of the laser pulse, before the birefringent medium,
  xii. adding to the spectral phase difference between ordinary and extraordinary components obtained in the previous step, the spectral phase of the reference polarization component from the laser pulse, obtaining the spectral phase of the ordinary component and/or extraordinary component,
  xiii. calculating complex spectral amplitudes of the projections of the ordinary and extraordinary polarization components of the laser pulse using the spectral amplitudes and phases of the two polarization components, ordinary and extraordinary, from the data obtained in the previous step and from the measurements of the spectra of each laser pulse polarization components,
  xiv. applying a Fourier transform to the complex spectral amplitudes of the ordinary and extraordinary components of the laser pulse to be analyzed, to obtain a temporal evolution of the ordinary and extraordinary components of the laser pulse, and
  xv. performing a vector sum of the temporal evolution of the ordinary and extraordinary components obtained for the laser pulse, obtaining the time evolution of the incident pulse and its polarization state.

3. The method of claim 2, wherein the measurement of the spectral phase of the reference component of step ix is carried out by a technique of reconstruction of pulses with constant linear polarization.

4. The method of claim 2, wherein the calibration comprises the steps of determining, using a laser pulse with a known polarization, the spectral phase difference between the ordinary and extraordinary components due to the birefringent medium.

5. The method of claim 2, wherein step viii is done previously to the birefringent medium.

* * * * *